United States Patent
Bafaro et al.

(10) Patent No.: US 11,112,809 B1
(45) Date of Patent: Sep. 7, 2021

(54) GAS ALARM AND SAFETY SYSTEM AND METHOD

(71) Applicants: Michael Bafaro, Schaumburg, IL (US); Theodore V. Lester, Schiller Park, IL (US); Peter Paul Walter, Elgin, IL (US)

(72) Inventors: Michael Bafaro, Schaumburg, IL (US); Theodore V. Lester, Schiller Park, IL (US); Peter Paul Walter, Elgin, IL (US)

(*) Notice: Subject to any disclaimer, the term of this patent is extended or adjusted under 35 U.S.C. 154(b) by 44 days.

(21) Appl. No.: 16/805,367

(22) Filed: Feb. 28, 2020

(51) Int. Cl.
| | |
|---|---|
| *F16K 31/02* | (2006.01) |
| *G05D 7/06* | (2006.01) |
| *G01M 3/04* | (2006.01) |
| *F16K 17/36* | (2006.01) |
| *G01M 3/16* | (2006.01) |
| *F16K 37/00* | (2006.01) |

(52) U.S. Cl.
CPC ........... *G05D 7/0635* (2013.01); *F16K 17/36* (2013.01); *G01M 3/04* (2013.01); *F16K 37/0075* (2013.01); *G01M 3/045* (2013.01); *G01M 3/16* (2013.01)

(58) Field of Classification Search
CPC ... G05D 7/0635; F16K 17/36; F16K 37/0075; G01M 3/04; G01M 3/045; G01M 3/16
USPC ........ 137/2, 487.5, 486, 552, 554, 557, 558, 137/559, 78.5, 78.4
See application file for complete search history.

(56) References Cited

U.S. PATENT DOCUMENTS

| | | | |
|---|---|---|---|
| 3,714,456 A | 1/1973 | Krohmer | |
| 3,995,651 A | 12/1976 | Adams | |
| 3,999,932 A | 12/1976 | Matthews | |
| 4,091,831 A | 5/1978 | Pazmany | |
| 4,103,697 A | 8/1978 | Kiesow | |
| 4,161,183 A | 7/1979 | Berry | |
| 4,261,379 A | 4/1981 | Berry | |
| 4,535,813 A | 8/1985 | Spain | |
| 5,057,822 A * | 10/1991 | Hoffman | A61M 16/10 340/611 |
| 5,549,130 A | 8/1996 | Schuster | |
| 5,601,108 A | 2/1997 | Perry | |
| 5,694,960 A | 12/1997 | Turk | |
| 5,722,448 A | 3/1998 | Dourado | |
| 5,826,559 A | 10/1998 | Ichimoto | |
| 5,896,089 A | 4/1999 | Bowles | |
| 5,902,099 A | 5/1999 | Rowlette | |

(Continued)

FOREIGN PATENT DOCUMENTS

| | | |
|---|---|---|
| CN | 102903211 A | 1/2013 |
| JP | WO 2009/107367 A1 | 9/2009 |
| JP | 2012103937 A | 5/2012 |

*Primary Examiner* — Minh Q Le
(74) *Attorney, Agent, or Firm* — Marc J. Whipple

(57) ABSTRACT

A system which detects gas leaks near devices which use "natural gas" or other flammable gases such as methane, ethane, propane or butane and implements multiple automatic responses to the detection of such leaks including emitting audible alarms, contacting utility and emergency service providers, and shutting off the flow of the flammable gases is disclosed. Optional to the system allowing the system to report on the approximate location of the leak and/or the approximate danger level caused by the leak by reporting on the gas/air ratios in the area are also disclosed. A method for implementing the method of the invention is also disclosed.

19 Claims, 2 Drawing Sheets

(56) References Cited

U.S. PATENT DOCUMENTS

| | | | | |
|---|---|---|---|---|
| 5,908,980 | A * | 6/1999 | Hwang | G01M 3/2815 |
| | | | | 73/40 |
| 6,000,931 | A | 12/1999 | Tanabe | |
| 6,045,352 | A * | 4/2000 | Nicholson | F24H 9/2085 |
| | | | | 431/22 |
| 6,085,772 | A | 7/2000 | McGill | |
| 6,170,509 | B1 | 1/2001 | Karta | |
| 6,374,850 | B1 | 4/2002 | Timm | |
| 6,661,346 | B1 | 12/2003 | Wood | |
| 7,112,059 | B2 | 9/2006 | Donnelly | |
| 7,458,387 | B2 * | 12/2008 | McGill | F16K 3/0209 |
| | | | | 137/15.03 |
| 8,251,085 | B2 * | 8/2012 | Goodson | F17D 5/08 |
| | | | | 137/78.4 |
| 8,493,232 | B2 * | 7/2013 | Cornwall | G01D 4/004 |
| | | | | 340/870.02 |
| 9,791,063 | B2 * | 10/2017 | Andueza | F16K 31/084 |
| 9,811,994 | B1 * | 11/2017 | Salzer | E05F 15/72 |
| 2005/0156730 | A1 * | 7/2005 | Chapman, Jr. | G08B 21/14 |
| | | | | 340/506 |
| 2011/0036424 | A1 * | 2/2011 | Oike | F16T 1/48 |
| | | | | 137/551 |
| 2015/0286222 | A1 * | 10/2015 | Goldstein | G05D 7/0635 |
| | | | | 700/282 |
| 2018/0052072 | A1 * | 2/2018 | Koh | G01N 21/3518 |
| 2018/0275011 | A1 * | 9/2018 | Saidi | G01M 3/2807 |
| 2018/0329092 | A1 * | 11/2018 | Ogden | F16K 17/36 |
| 2019/0226595 | A1 * | 7/2019 | Mattos | F17D 5/06 |
| 2019/0258278 | A1 * | 8/2019 | Zokaei | G08B 25/10 |
| 2019/0391034 | A1 * | 12/2019 | Al Jabri | G01M 3/04 |
| 2020/0080758 | A1 * | 3/2020 | Albright | G05D 7/0635 |
| 2020/0370990 | A1 * | 11/2020 | Chang | G05D 7/0635 |

* cited by examiner

GAS ALARM AND SAFETY SYSTEM AND METHOD

This invention relates to a system which detects gas leaks near devices which use "natural gas" or other flammable gases such as methane, ethane, propane, or butane and implements multiple automatic responses to the detection of such leaks including emitting audible and/or visible alarms, shutting off the flow of the flammable gases, and contacting utility and emergency service providers. The system can also report on the approximate location of the leak and/or the approximate danger level caused by the leak by reporting on the gas/air ratios in the area. A method for implementing the invention is also described.

BACKGROUND OF THE INVENTION

The present invention relates to a gas alarm and safety system. For purposes of this application, "gas" should be understood to be a flammable material which assumes a gaseous state at the temperatures and pressures normally found in human-occupied buildings. While many gases, in the common usage, are not flammable, for purposes of this application "gas" means "flammable gas," or a gas which will burn at the proper ratio of gas to atmospheric air. Atmospheric air is a mixture of what are usually called gases, but for purposes of this application atmospheric air will be referred to as "air." It is required that air contain oxygen at a ratio roughly equal to that of ordinary atmospheric air at temperatures and pressures normally found in human-occupied buildings. Gas is usually allowed to mix with air inside heating devices and then exposed to an ignition source, producing heat and combustion products.

For instance, "natural gas" is a common fuel in homes and businesses, used to provide environmental heating, cooking heat, heat for drying wet materials, and many other purposes. Natural gas is mostly comprised of methane, with various impurities, odorants, and some higher alkanes such as propane, butane, or ethane. Although the preferred embodiment is described in terms of natural gas delivery systems, it should be understood that the system will work with any appropriate flammable gas.

Products which detect gas leaks are well-known in the art, including hydrocarbon detectors which detect the presence of the hydrocarbons which make natural gas flammable. Similarly, gas alarms, which use such detectors to produce audible alarms, flashing lights, et cetera to alert nearby persons to the presence of gas, are well-known. However, the known art suffers from multiple limitations.

Existing gas alarm and safety systems do not detect gas leaks, produce alarms to nearby persons, notify emergency services (to respond quickly,) notify utility services (to allow for expert response,) and shut off the flow of gas (to minimize damage from any fire or explosion) are not available. A gas alarm and safety system which did not suffer from these limitations would be a useful invention.

Further, existing gas alarm and safety systems do not detect gas leaks, produce alarms to nearby persons, shut off the flow of gas, and notify emergency services and/or notify utility services, while providing information about the location of the leaks. A gas alarm and safety system which did not suffer from these limitations would be a useful invention.

Additionally, existing gas alarm and safety systems do not detect gas leaks, produce alarms to nearby persons, shut off the flow of gas, and notify emergency services and/or notify utility services, while providing information about the concentration of gas in the vicinity of the leaks. A gas alarm and safety system which did not suffer from these limitations would be a useful invention.

There exists no unified and consistent method to implement detecting a gas leak, providing alarms to remote services, and shut off the flow of gas. A method to detect gas leaks, provide alarms, send remote notifications, and shut off the flow of gas would be a useful invention.

The present invention addresses these concerns.

SUMMARY OF THE INVENTION

Among the many objectives of the present invention is the provision of a gas alarm and safety system which detects gas leaks, shuts off the flow of gas in response to gas leaks, and notifies one or more remote monitoring systems of the presence of gas leaks.

Another objective of the present invention is the provision of a gas alarm and safety system which detects gas leaks, shuts off the flow of gas in response to gas leaks, provides audible and/or visual alerts to nearby persons, and notifies one or more remote monitoring systems of the presence of gas leaks.

Another objective of the present invention is the provision of a gas alarm and safety system which detects gas leaks, shuts off the flow of gas in response to gas leaks, provides information about the particular location of a gas leak within a building, and notifies one or more remote monitoring systems of the presence of gas leaks.

Another objective of the present invention is the provision of a gas alarm and safety system which detects gas leaks, shuts off the flow of gas in response to gas leaks, provides information about the relative concentrations of gas and air in the vicinity of the gas leak, and notifies one or more remote monitoring systems of the presence of gas leaks.

Yet another objective of the present invention is the provision of a method of implementing a gas alarm and safety system as disclosed herein.

DESCRIPTION OF THE PREFERRED EMBODIMENTS

Figure 1:
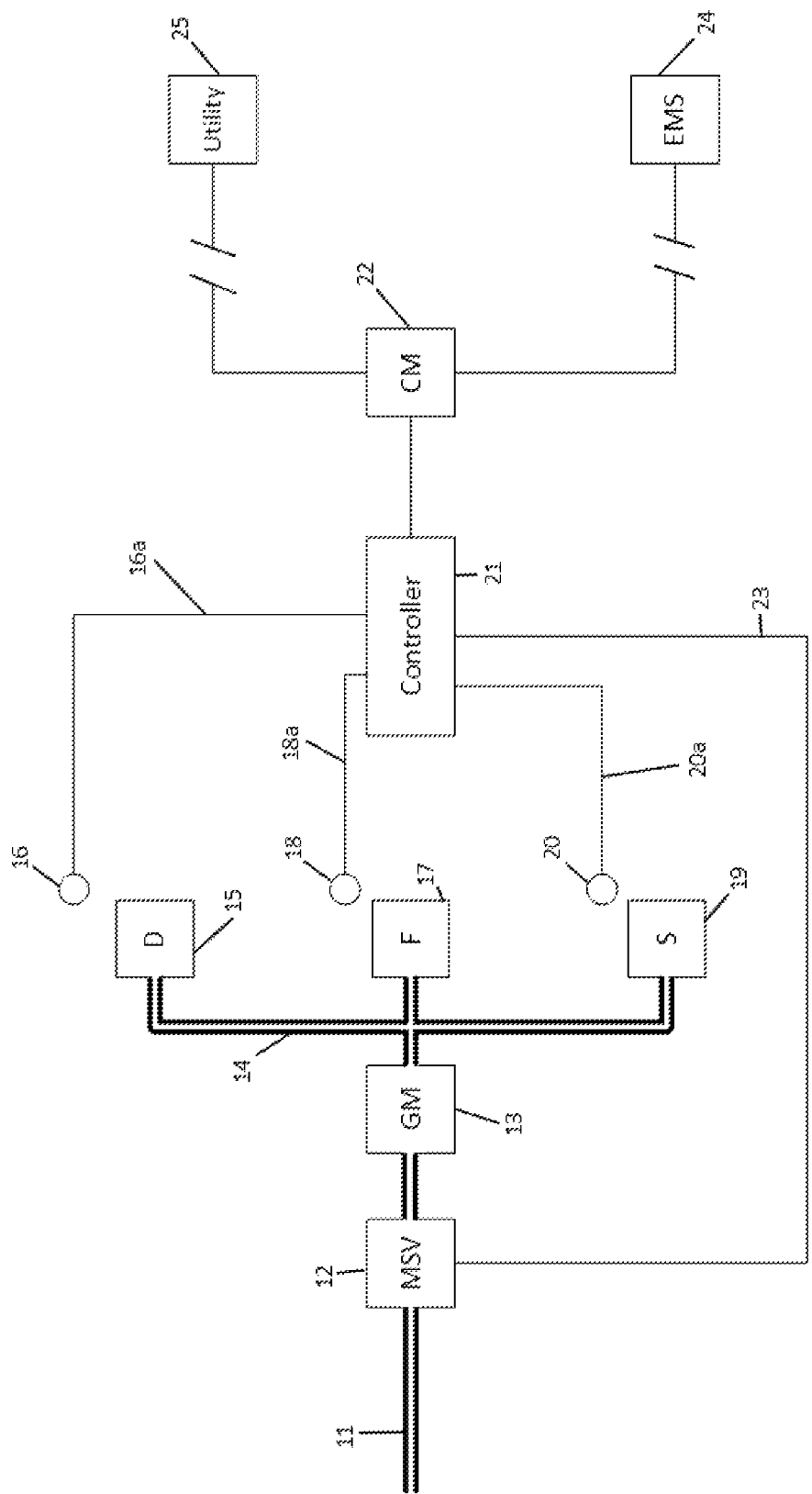
FIG. 1 depicts an abstracted schematic of the preferred embodiment of the invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

By referring to FIG. 1, the basic nature of the invention can be easily understood. Gas is fed into a building (such as a house, factory, or other structure) through gas supply line 11, which is ultimately connected to some external gas supply (not shown.) Master shutoff valve 12 can shut off the flow of gas to the entire building. It is required that the master shutoff valve incorporate or be operably affixed to a mechanical actuator (not shown) which can close the valve without direct human action in response to an electrical signal of some kind. It is neither preferred nor required that the actuator be able to open the valve without direct human action or that the master shutoff valve be able be able to be closed with direct human action.

Gas flows through master shutoff valve 12 into (optional) gas meter 13. It is optional for the master shutoff valve, the actuator, and the gas meter to be in a single housing or assembly. It is preferred, but not required, that the master shutoff valve and the actuator be separated from the gas meter for ease of access. It is preferred, but not required, that the actuator be a physically separate device operably affixed to the master shutoff valve for ease of maintenance. It is slightly preferred, but not required, that the shutoff valve be placed prior to the gas meter in the flow direction of the gas as this will prevent gas from escaping from the gas meter itself if the gas meter is damaged or malfunctioning. If a gas leak sensor is placed near the gas meter, it is required that the master shutoff valve be placed prior to the gas meter in the flow direction of the gas. Otherwise, for purposes of this application, no particular relative placement of the gas meter and the master shutoff valve in the flow direction of the gas is preferred or required.

Once the gas flows through the gas meter, it is fed through internal gas line(s) 14 to any desired number of gas-using devices, shown here as dryer 15, furnace 17, and stove 19. It is the usual practice in the art for each gas-using device to have its own individual shutoff valve, but this is not required to practice the invention.

Located in reasonable proximity to each gas-using device is a gas leak sensor, here shown as dryer leak sensor 16, furnace leak sensor 18, and stove leak sensor 20. Each gas leak sensor is an electronic device that detects the presence of the gas in the internal gas lines (or some component of it, e.g. a hydrocarbon molecule or molecules in the case of natural gas.) If the gas leak sensor detects the presence of the gas, it sends a leak detection signal to controller 21, here through either dryer leak sensor line 16a, furnace leak sensor line 18a, or stove leak sensor line 20a. It is optional, but neither preferred nor required, to put a gas leak sensor near the gas meter or other fittings or gas line joints which may also produce gas leaks if they fail or malfunction. If gas leak sensors are placed near fittings or gas line joints, it is preferred, but not required that priority in gas leak sensor placement be assigned to fittings or gas line joints in enclosed spaces (e.g. inside buildings) as these would produce the highest risk of explosion or fire in the event of a gas leak.

Regarding the gas leak sensors, it is strongly preferred, but not required, that:
  a) the gas leak sensors be located far enough away from any point where gas leaves the gas-using device that they will not detect negligible amounts of gas and produce false alerts of danger and unnecessary gas shutoffs; and/or
  b) that the gas leak sensors not be sensitive enough to detect negligible amounts of gas and produce false alerts of danger and unnecessary gas shutoffs; and/or
  c) that the system controller be able to evaluate data from the gas leak sensors and activate alarms/send notifications only if non-negligible concentrations of gas are detected to reduce false alerts of danger and unnecessary gas shutoffs;
  d) or some combination of these things are be true to avoid false alerts of danger and unnecessary gas shutoffs.

Controller 21 is a device which either runs special-purpose software on a general purpose computer or uses software, preprogrammed hardware, or both on a special-purpose electronic device to monitor the gas leak sensors for leak detection signals. Once a leak detection signal reaches controller 21, controller 21 executes multiple instructions which, in whatever order desired;
  a) send a shutoff signal to the actuator attached to master shutoff valve 12 (here, through master shutoff signal line 23) which causes the actuator to close master shutoff valve 12, cutting off the flow of gas to the building and reducing the risk of fire, explosion, or environmental toxicity; and,
  b) send a leak alert signal through communications module 22 to at least one of utility company monitoring system 24 and emergency services monitoring system 25.

It should be noted that while here the controller is using a communications module to communicate with two different recipients, the communications module could send the signal to a single remote leak monitoring system which could then in turn send the signal to the utility company and/or local emergency services. The communications module may also be implemented through a landline modem, a network interface such as Ethernet which in turns communicates through an Internet connection, or a cellular modem integrated into the controller instead of a separate device.

Once the shutoff signal is sent, no more gas will flow into the building, reducing the ongoing risk of fire, explosion or atmospheric toxicity. Once the signal is sent to emergency services, first responders can be dispatched to the building to conduct evacuations, keep the public to a safe distance, and/or respond to any fire, explosion, or environmental toxicity dangers which have already arisen. Once the signal is sent to the utility company, trained personnel with appropriate equipment can be dispatched to the building to evaluate risks, conduct risk mitigation (e.g. safely and effectively implement procedures to clear out accumulated gas) and implement repairs to the gas system.

It is strongly preferred, but not required, that controller 21 also activate one or more alarm devices, which can include visible alarms (flashing lights,) audible alarms (sirens, bells, or buzzers) or both, the alarm devices signaling people in or near the building that a gas leak exists and that they should respond appropriately.

It is strongly preferred, but not required, that each gas leak sensor be uniquely identifiable to the system controller. In some alternative configurations (infra) it is required that each gas leak sensor be uniquely identifiable to the system controller.

Figure 2:
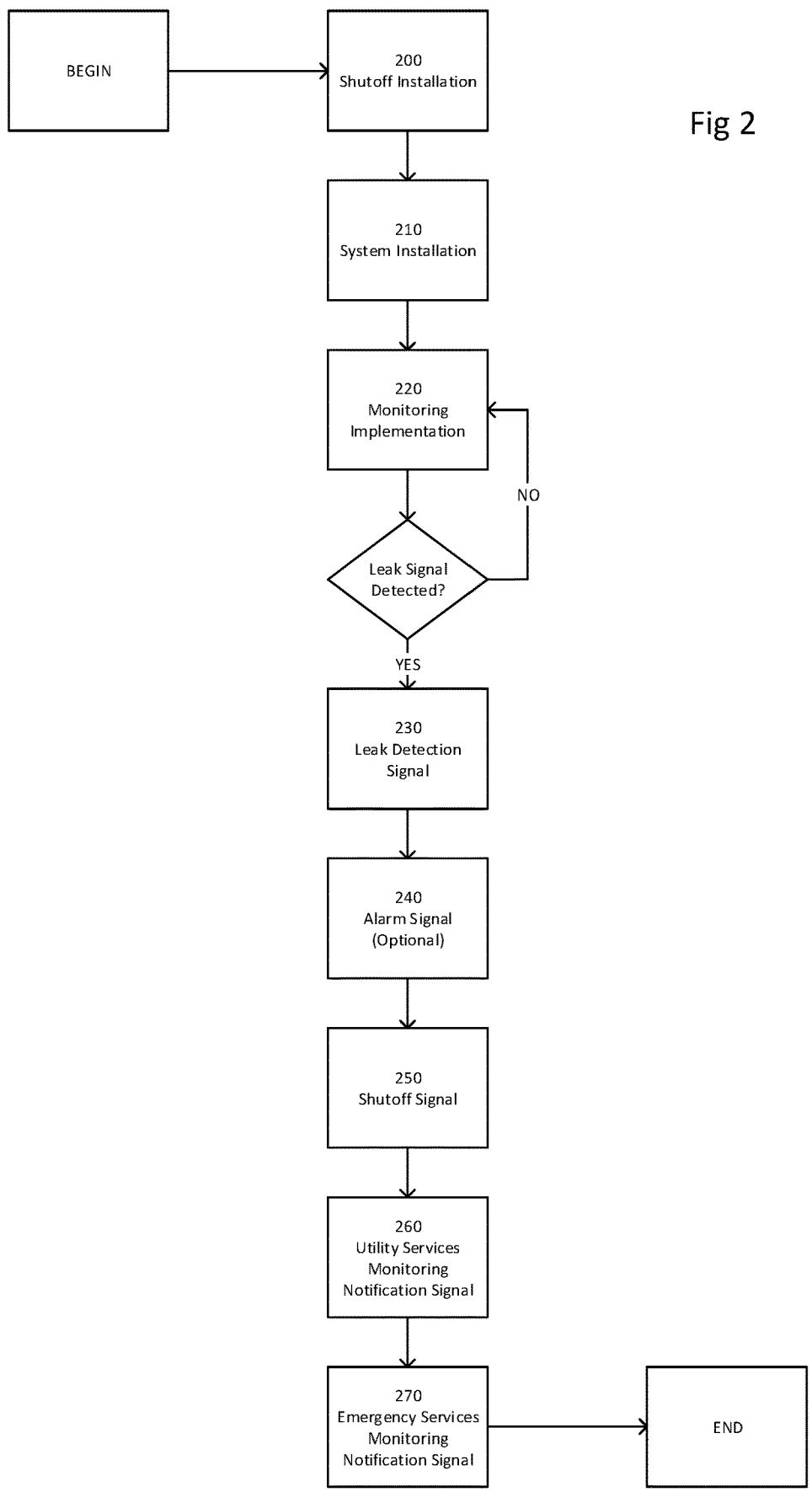
FIG. 2 is a flow chart showing the steps which comprise a method of implementing the system of the invention.

FIG. 2 depicts an implementation of the invention as a method. The method comprises the following steps:

In Shutoff Installation Step 200, a master shutoff valve actuator is connected to a master shutoff valve which controls gas flow into a building. This may be done when the gas lines are first installed or at any later date.

In System Installation Step 210, a gas alarm and safety system controller ("controller") and one or more gas leak sensors are installed in the building, with each gas leak detector being reasonably proximate to a gas-using device and the gas leak sensors connected to the controller such that the controller an receive a leak detection signal from each gas leak sensor when that gas leak sensor detects the presence of gas.

In Monitoring Implementation Step 220, the system is activated and the controller monitors the gas leak sensors for gas leak detection signals. It is optional to have the gas leak sensors send periodic signals to the controller to ensure that they are operational and capable of transmitting signals. If a gas leak signal is detected, the method continues to the next step. Otherwise, the system continues to monitor the gas leak sensors and the method waits to continue.

In Leak Detection Step 230, a leak detection signal is received by the controller, and the method continues.

In optional Alarm Signal Step 240, visual and/or auditory alarms are triggered to alert persons in the vicinity of the building that a gas leak has been detected and that they should respond appropriately, and the method continues.

In Shutoff Signal Step 250, a shutoff signal is sent to the master shutoff valve actuator, which closes the valve and stops the flow of gas into the building, and the method continues.

In Utility Monitoring System Notification Step 260, a utility notification signal is sent to a utility monitoring system, and utility service personnel are dispatched to the building if it is determined that it is appropriate to dispatch such personnel, and the method continues.

In Emergency Services Monitoring System Notification Step 270, an emergency services notification signal is sent to an emergency services monitoring system, and emergency services personnel are dispatched to the building if it is determined that it is appropriate to dispatch such personnel, and the method ends.

A first optional improvement to the invention (not shown) is providing information regarding the location of the leak to the remote monitoring systems. The location may be communicated by transmitting a verbal description of the gas-using device associated with the gas leak sensor which has detected a gas leak, e.g. "Dryer Gas Leak Detected." The location also may be communicated by transmitting a verbal description of the location of the leak, by transmitting a graphic image of the building showing the location of the leak, or both. In this configuration it is required that the gas leak sensors be uniquely identifiable to the system controller.

A second optional improvement to the invention (not shown,) which may be combined with the first improvement or used separately, is detecting the current ratio of gas to air in the proximity of a gas-using device and communicating that ratio to the remote monitoring systems. This can provide valuable information, including identifying the urgency of response, the potential risk of a fire or explosion, or the possibility of atmospheric toxicity.

A third optional improvement to the invention (not shown,) which may be used in combination with the first improvement and/or the second optional improvement and/or used separately, is detecting the current ratio of gas to air in the proximity of a gas-using device and communicating a combustion risk warning to the remote monitoring system(s.) The combustion risk warning may be communicated by transmitting the current ratio and a known combustion risk ratio, the current ratio and an indication that the current ratio exceeds the combustion risk ratio, and/or both. For instance, natural gas will not burn unless the ratio of natural gas to air is at least 5%. If the system detects that 3% of the ambient gases are natural gas, there is no combustion risk. If the system detects that 6% of the ambient gases are natural gas, there is a combustion risk. It could simply transmit the percentage ratio, or it could transmit the ratio plus verbiage indicating combustion risk, e.g. "GAS RATIO 3% NO COMBUSTION RISK" or "GAS RATIO 6% COMBUSTION RISK PRESENT." A simple graphic indication (e.g. any ratio with combustion risk is transmitted/displayed in red, with no-risk ratios in green) may also be used. It is optional, but neither preferred nor required, to also use the ratio of gas to air to calculate whether a warning regarding respiration is required, either from environmental gas toxicity or from inadequate levels of environmental oxygen. (E.g. "GAS RATIO OVER 40% RESPIRATOR REQUIRED.") In this configuration it is required that the gas leak sensors be uniquely identifiable to the system controller if location information is to be included in the combustion risk warning or other signals sent to the monitoring system(s.)

A fourth optional improvement to the invention (not shown,) is to include a shutoff confirmation signal means in the shutoff valve or the actuator which transmits a confirmation signal to the controller when the shutoff valve is closed. It is preferred but not required, if this improvement is used, to allow the controller to communicate to all available monitoring systems that the shutoff confirmation signal was or was not received.

A fifth optional improvement to the invention (not shown,) is having the controller send a gas leak detection alert to the building owner, the building tenant, the building property manager, and/or any other desired recipients. This alert could be sent via text message, email, automated voice call, or any other desired means.

A sixth optional improvement to the invention (not shown,) is including a gas leak detection information display at one or more places (e.g. at the front entrance of the building) which will communicate with the controller and display information about the gas leak detection alert to people who are responding to the gas leak detection alert, including gas/air ratios and the location of the leak. In this configuration it is required that the gas leak sensors be uniquely identifiable to the system controller.

A seventh optional improvement (not shown) is to add a manual override to the gas alarm and safety system which allows an authorized person to deactivate one or more of the gas leak sensors and/or tell the system controller to disregard leak detection signals from one or more of the gas leak sensors for a period of time. This allows testing, maintenance and replacement of gas lines which could involve the release of small amounts of gas, and/or the use of products (e.g. insect sprays containing hydrocarbons) which might cause the gas leak sensor(s) to report a gas leak in error in the vicinity of the gas leak sensor(s). In this configuration it is required that the gas leak sensors be uniquely identifiable to the system controller if the authorized person is to be able to specify particular gas leak sensors to be deactivated or disregarded.

While the preferred embodiment is described in terms of a house using natural gas for one or more heating devices, it should be noted that the invention will work with any system which allows the transmission of flammable gaseous fuels, or even flammable gases not intended for use as fuels but for which leaks may present a danger of fire or explosion. If the optional third improvement described above is used, it is required that the combustion ratio warning parameters be calculated such that the warning provides accurate risk warnings for the combination of air and whatever flammable gas is transported in the system to be monitored. It is strongly preferred, but not required, that all electrical components of the system which use mains power include a backup power supply, such as a battery, to allow them to continue to function if mains power is interrupted.

While some of the components of the gas alarm and safety system are described as sending signals through wired connections, it is optional to use wired or wireless transmission means to accomplish the same result. For instance, each of the gas leak sensors may be a self-contained unit which includes the gas leak sensor, any required electronics, and a wireless transceiver. The wireless transceiver may be proprietary to the gas alarm and safety system or may use standard wireless transceiver technology such as Bluetooth or WiFi.

In a first alternate embodiment (not shown,) instead of or in addition to the master shutoff valve, there is a shutoff valve for each gas-using device. This may be preferred or required in environments where it would be dangerous or economically unjustified to shut off all of the devices in the building if a single gas-using device has a leak.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

What is claimed and sought to be protected by Letters Patent is:

1. A gas alarm and safety system comprising:
   a) A master shutoff valve, the master shutoff valve operably affixed to a gas feed line, the gas feed line carrying a gas from a gas supply;
   b) An internal gas line, operably affixed to the master shutoff valve such that the gas flows from the gas supply through the gas feed line, and then through the master shutoff valve to the internal gas line and then to one or more gas-using devices such that the gas-using devices are supplied with gas from the gas supply while the master shutoff valve is open;
   c) A master shutoff valve actuator, the master shutoff valve actuator operably affixed to the master shutoff valve such that the master shutoff valve actuator can close the master shutoff valve upon receiving a shutoff signal;
   d) One or more gas leak sensors which can detect an ambient gas/air ratio, and the gas leak detection alert includes the ambient gas/air ratio, all of the gas leak sensors placed proximate to at least one of the one or more gas-using devices such that if the gas is released from at least one of the gas-using devices or the internal gas line in the vicinity of at least one of the gas-using devices, at least one of the gas leak sensors can send a gas leak detection signal to a controller, the gas leak detection signal including the ambient gas/air ratio, and the controller can send the shutoff signal to the master shutoff valve actuator;
   e) A communications module operably affixed to the controller, the communications module in electronic communication with an external monitoring system such that when the controller receives the gas leak detection signal, the controller can send a gas leak detection alert including the ambient gas/air ratio to the external monitoring system.

2. A gas alarm and safety system as in claim 1, further comprising:
   f) At least one local alarm indicator, the local alarm indicator comprising a visible alert device or an audible alert device, the at least one local alarm indicator operably connected to the controller such that when the controller receives the gas leak detection signal, the controller can cause the local alarm indicator to emit a gas leak alarm indication.

3. A gas alarm and safety system as in claim 2, wherein the controller can determine whether the ambient gas/air ratio exceeds a combustion risk ratio, and if the ambient gas/air ratio exceeds the combustion ratio, the gas leak detection alert includes a combustion risk alert.

4. A gas alarm and safety system as in claim 2, wherein each of the at least one gas leak sensors is associated with a fixed location description, and wherein the gas leak detection alert includes the fixed location description.

5. A gas alarm and safety system as in claim 4, wherein each of the fixed location descriptions is associated with a point on a building layout diagram, and the gas leak detection alert includes the building layout diagram and the fixed location description.

6. A gas alarm and safety system as in claim 1, wherein the controller can determine whether the ambient gas/air ratio exceeds a combustion risk ratio, and if the ambient gas/air ratio exceeds the combustion ratio, the gas leak detection alert includes a combustion risk alert.

7. A gas alarm and safety system as in claim 6, wherein each of the at least one gas leak sensors is associated with a fixed location description, and wherein the gas leak detection alert includes the fixed location description.

8. A gas alarm and safety system as in claim 7, wherein each of the fixed location descriptions is associated with a point on a building layout diagram, and the gas leak detection alert includes the building layout diagram and the fixed location description.

9. A gas alarm and safety system as in claim 1, wherein each of the at least one gas leak sensors is associated with a fixed location description, and wherein the gas leak detection alert includes the fixed location description.

10. A gas alarm and safety system as in claim 9, wherein each of the fixed location descriptions is associated with a point on a building layout diagram, and the gas leak detection alert includes the building layout diagram and the fixed location description.

11. A method for detecting gas leaks and implementing automatic safety responses comprising the steps of:
   a) Installing a master shutoff valve having a master shutoff valve actuator into a gas feed line, the gas feed line supplying one or more gas-using devices;
   b) Installing one or more gas leak sensors capable of detecting an ambient gas/air ratio in operable proximity to one or more of the one or more gas-using devices, each of the gas leak sensors being capable of sending a gas leak detection signal including the ambient gas/air ratio to a controller;
   c) Monitoring the one or more gas leak sensors with the controller such that the controller waits for one or more of the gas leak sensors to send the gas leak detection signal to the controller, and then continuing the method;

d) Sending a shutoff signal from the controller to the master shutoff valve actuator such that the master shutoff valve actuator will close the master shutoff valve; and, e) Sending a gas leak detection alert including the ambient gas/air ratio from the controller to one or more external monitoring systems.

12. A method for detecting gas leaks and implementing automatic safety responses as in claim 11 further comprising the steps of:

f) Activating one or more alarm devices after the controller receives the gas leak detection signal, the one or more alarm devices emitting a visible alarm or an audible alarm to one or more persons in a risk proximity to the gas leak sensor which sent the gas leak detection signal to the controller.

13. A method for detecting gas leaks and implementing automatic safety responses as in claim 12 wherein the controller can determine whether the ambient gas/air ratio exceeds a combustion risk ratio, and if the ambient gas/air ratio exceeds the combustion ratio, the gas leak detection alert includes a combustion risk alert.

14. A method for detecting gas leaks and implementing automatic safety responses as in claim 11 wherein each of the at least one gas leak sensors is associated with a fixed location description, and wherein the gas leak detection alert includes the fixed location description.

15. A method for detecting gas leaks and implementing automatic safety responses as in claim 11 wherein the controller can determine whether the ambient gas/air ratio exceeds a combustion risk ratio, and if the ambient gas/air ratio exceeds the combustion ratio, the gas leak detection alert includes a combustion risk alert.

16. A method for detecting gas leaks and implementing automatic safety responses as in claim 15 wherein each of the at least one gas leak sensors is associated with a fixed location description, and wherein the gas leak detection alert includes the fixed location description.

17. A method for detecting gas leaks and implementing automatic safety responses as in claim 15 wherein in response to a first gas leak detection signal indicating a first ambient gas/air ratio the controller can send a first gas leak detection alert which does not include the combustion risk alert, and wherein after sending the first gas leak detection alert, in response to a second gas leak detection signal indicating a second ambient gas/air ratio which indicates a combustion risk, the controller can send a second gas leak detection alert including the combustion risk alert.

18. A method for detecting gas leaks and implementing automatic safety responses as in claim 17 wherein each of the at least one gas leak sensors is associated with a fixed location description, and wherein the gas leak detection alert includes the fixed location description.

19. A gas alarm and safety system comprising:

a) A master shutoff valve, the master shutoff valve operably affixed to a gas feed line, the gas feed line carrying a gas from a gas supply;

b) An internal gas line, operably affixed to the master shutoff valve such that the gas flows from the gas supply through the gas feed line, and then through the master shutoff valve to the internal gas line and then to one or more gas-using devices such that the gas-using devices are supplied with gas from the gas supply while the master shutoff valve is open;

c) A master shutoff valve actuator, the master shutoff valve actuator operably affixed to the master shutoff valve such that the master shutoff valve actuator can close the master shutoff valve upon receiving a shutoff signal;

d) One or more gas leak sensors which can detect an ambient gas/air ratio, and the gas leak detection alert includes the ambient gas/air ratio, all of the gas leak sensors placed proximate to at least one of the one or more gas-using devices such that if the gas is released from at least one of the gas-using devices or the internal gas line in the vicinity of at least one of the gas-using devices, at least one of the gas leak sensors can send a gas leak detection signal to a controller, wherein the controller can determine whether the ambient gas/air ratio is a potential combustion risk indicating a combustion risk alert, and the controller can send the shutoff signal to the master shutoff valve actuator;

e) A communications module operably affixed to the controller, the communications module in electronic communication with an external monitoring system such that when the controller receives the gas leak detection signal, the controller can send a gas leak detection alert including the combustion risk alert if the combustion risk alert is indicated, to the external monitoring system.

* * * * *